Re. 25704

May 22, 1956 C. A. VAN PAPPELENDAM 2,746,139

METHOD OF FABRICATING STRUCTURAL SANDWICHES

Filed Oct. 6, 1952

CARL A. VAN PAPPELENDAM,
INVENTOR.

BY
ATTORNEY

2,746,139

METHOD OF FABRICATING STRUCTURAL SANDWICHES

Carl A. van Pappelendam, Rivera, Calif.

Application October 6, 1952, Serial No. 313,222

4 Claims. (Cl. 29—455)

The present invention relates to structural sandwiches made of sheet material, to a new and improved method for the making of such sandwiches, and to apparatus for the carrying out of that method. More specifically the invention comprises a structural sandwich in which longitudinally corrugated sheet material is secured top and bottom to planar sheet material, to a method by which the sandwich can be formed continuously and in any desired length, and to an apparatus capable of carrying out the improved method.

Today in many structural applications, and particularly in aircraft construction, it is extremely desirable and even necessary that the strength of an element be relatively great as compared to its weight. Solid sections tend to have excessive weight yet the strength in bending torsion, sheer and endwise compression which such solid sections offer is desirable and cannot be provided by solid sections of the same material of lesser cross sectional area. Fabricated sandwiches incorporating a core of thin sheet material shaped to extend back and forth between face plates, also of a thin sheet metal, have been found to provide surprising strength and rigidity. It is in this type of construction that the present invention lies, a construction in which the core is deformed in a continuous length which, following deformation and heat treatment if desired, is permanently affixed between the planar sheet members by a continuous process comprehending a wide variety of joining methods such as resistance welding, arc welding, brazing, stitching, and other means as will be set forth. To make this forming and fabricating method continuous it is essential that the core be shaped as to provide longitudinally arranged, with respect to the direction of travel of the core, lines or surfaces of contact. Additionally, and in order to obtain maximum strength where that factor is desired, the corrugations are provided with flat sloping sides between top and bottom ridges the widths of which are maintained at a minimum consistent with proper joining. The process is susceptible of application to a wide range of materials in addition to metals and including plastics, fabrics and even rubber.

It is an object of the present invention to provide a new and improved sandwich-type structural element in the form of a panel having increased bending and torsional strength.

It is another object of the invention to provide a new and improved corrugated core sandwich-type structural sheet element in which the core is corrugated to form hills and valleys running longitudinally of the length of the element.

It is still another object of the invention to provide a new and improved corrugated core sandwich-type structural planar element in which the core is longitudinally corrugated, the sides of the core forming the hills and the valleys being flat.

A further object of the invention is to provide an improved method for fabricating continuous length sandwich-type structural elements.

Still another object of the invention is to provide an improved method of fabricating a continuous length sandwich-type cellular construction.

A further object of the invention is to provide an improved method for fabricating panels formed of planar material sheets and a corrugated core.

Still another object of the invention is to provide an improved apparatus capable of carrying out the methods which also comprise the invention.

A further object of the invention is to provide an improved apparatus for the fabrication of continuous length sheet members into a sandwich-type panel comprising spaced flat sheets connected by a corrugated core.

These and other more specific objects will appear upon reading the following specification and claims and upon considering in connection therewith the attached drawing to which they relate.

Referring now to the drawing in which preferred embodiments of the invention are disclosed and in which the same reference character refers to the same part throughout:

Figure 5 is a diagrammatic showing of a riveting unit adapted to be substituted for the electric welding unit in the apparatus of Figure 1;

In the fabrication of sandwich-type panels in accordance with the present invention use may be made of a wide range of flat sheet material depending upon the use to which the final product is to be put. The material may be selected from classes of material having one or more of the following properties: high strength, ductility, thermal and electrical conductivity, heat resistance, and resistance to corrosive effects of liquids. Because of the improved design of the core of the panel constructed in accordance with the present invention, and because of the improved method of fabrication, material of thinner section can be used without sacrifice of strength. Sandwich-type panels have heretofore been of a type in which the core was not so shaped that its corrugations extended longitudinally. Possibly the best known form of core comprises a honeycomb material in which the cellular structure is arranged with the open ends of the cells abutting the face plates of the panel. In accordance with the present invention the corrugations which form the cells, conduits or ducts within the panel are so arranged that the cells extend longitudinally of the material or product which can be made to any desired length by continuous fabrication.

In the practice of the present invention three components of flat planar material are used in the form of sheets the characteristics of which are variable as described. Two of the sheets, which may come from rolls, provide the exterior faces of the product while the third sheet, which initially must be somewhat wider than the other two sheets because of the forming treatment to which it is to be subjected, is positioned between the two face sheets and forms what is known as the core. The core sheet is deformed to provide longitudinally extending corrugations, the flat sides of the hills and valleys of which meet at ridges having the minimum area of contact with the face sheets consistent with the forming of a permanent joint. The sides of the longitudinally extending corrugations are flat in the sense that transversely they are not bowed or shaped to conform to a sine curve in a manner common to impressed corrugations. However, in the preferred form each side is not absolutely smooth but instead is formed with ribs which extend up and down the sides forming the hills and valleys, the ribs alternating in the directions in which they deviate from the mid-plane of the side. The core sheet, after being deformed, may be subjected to heat treatment to relieve stresses resulting from the forming action and, when necessary, to impart characteristics of the material which may be desirable in view of the use to which the end product is to be put.

Figure 1:
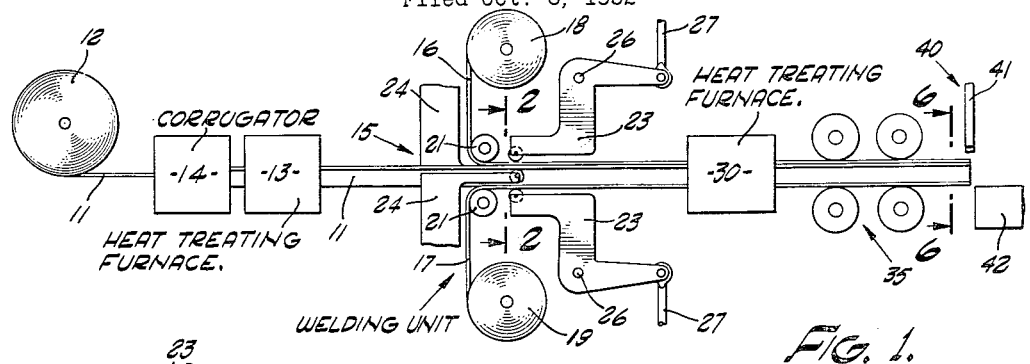
Figure 1 is a diagrammatic showing of a preferred form of apparatus capable of fabricating continuous lengths of sandwich-type panels from flat planar sheets.
Figure 2:
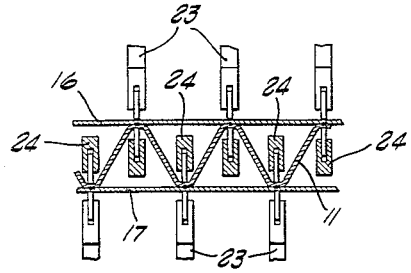
Figure 2 is a partial section upon the line 2—2 of Figure 1 and shows the relationship of the contacts of the welding unit to the material being fabricated.

Referring to the drawing and to Figures 1 and 2 in particular, a first embodiment of apparatus capable of carrying out the method is illustrated schematically and it is seen that the core sheet 11, which comes from a suitable supply 12 which may be a rotatable roll of the material, passes through a forming machine called a corrugator 14 in which the sheet is shaped to form continuous corrugations, and then through a heat treating furnace 13 for the purposes of stress relief. After being formed and heat treated, as described, the core 11 is fed between the face sheets at the joining machine 15 which, in the embodiment of Figure 1, is illustrated as a welding unit. The face sheets or plates are indicated by the reference characters 16 and 17, respectively, and, in the manner of core sheet 11, come from rotatable rolls or supplies 18 and 19, respectively. From their supplies the face sheets 16 and 17 move toward one another and, upon passing around guide rollers 21, make abutting contact with the longitudinally extending ridges of core sheet 11.

In the joining machine 15 of the first embodiment of the invention face plates 16 and 17 are permanently secured to the core 11 by resistance welding. The welding action takes place immediately upon the three sheets being brought into juxtaposition and upon passing between contacts which conduct the electric welding current and which abut the sheets to be welded at opposed points spaced by the thickness of the core sheet and one face sheet. The welding current in flowing between the contacts effects the joining action desired. This requires the presence of a bank of exterior current-carrying contacts 23 and a bank of interior contacts 24, the latter being so denominated due to the fact that each extends interiorly between the face sheets and adjacent the core sheet, as illustrated best in Figure 2. Each interior contact extends to a position directly opposite the point of contact made with a face sheet by an exterior contact 23 which, in a preferred form, includes sheet-contacting rollers. We are dealing here with dimensions which, in certain forms of the product, are relatively small so that the interior contacts 24 do in fact become, in an apparatus fabricating such small constructions, very small finger-like members extending longitudinally into the core. The exterior contacts 23 may be pivotally mounted at 26 and a pivoting force may be exerted thereon through levers 27 sufficient to insure that the exterior face plate which each exterior contact abuts will be forced against the core and the interior contact 24. The latter may also be pivotally mounted and so pivoted if desired. If preferred, the guide rollers 21 can be omitted and the rollers of the outer contacts permitted to perform their function.

The various welding contacts 23 upon one side of the product may, within the scope of the invention, be interconnected for operation as a single unit or bank, and the same is true of the interior contacts 24. Obviously only those contacts can be joined and banked which are upon the same side of the core sheet and the face sheets. It is clear that the joining of the sheets takes place at a point which is not only the point of initial contact with the cooperating sheets but also at a point which presents the last chance for the operation which chance is lost once the sheets have passed into full parallelism.

After passing through the welding unit 15 the product, now an integral sandwich, passes through a heat treating furnace 30 in which internal stresses created by the joining operation are relieved and released. Such internal stresses are a minimum, and so is the distortion inherent when such stresses are present because of the simultaneous connection of the top and bottom face sheets to the core across the entire width of the product. Any stresses present, however, tend to occur equally in the opposite faces and sides of the product to effect neutralization. Such as are present are relieved by the final heat treatment in the heat treating furnace 30.

The movement imparted to the product through the joining machine, and through the furnace 30, is provided by a battery of driving rollers, indicated generally at 35. These contact the top and bottom face sheets of the product in frictional driving relationship and are themselves driven by any suitable conventional means and at a speed such that the sheets 11, 16 and 17 move at the proper rate through the joining machine to effect optimum operation. These driving means could be positioned in the system before the product reaches the furnace 30, should that be desired, it being important only that they are so positioned and arranged as to be able to provide the necessary moving force.

The product in the final step is cut to desired lengths by the operation of a cutting unit indicated generally by the reference character 40. Unit 40 may be of any suitable type capable of severing the product across its entire width without undue distortion or disturbance. In the form illustrated the unit comprises a reciprocating saw element 41 and a cooperating rigid table or base 42. The timing of the action of the severing unit 40 determines the length of each panel. The panels can, if desired, be made in relatively great lengths and later cut to desired sub-lengths.

It is within the scope of the invention that other steps may be added in the process, either between certain of the described steps or thereafter, which additional steps, however, are subsidiary in the sense that they are present only to improve the appearance or external characteristics of the product. Such steps include but are not limited to sanding, polishing, painting, plating, etc., and are to be understood to form no essential part of the present invention.

In the method and apparatus described in connection with Figures 1 and 2 the joining machine 15 comprises a welding unit. It is to be understood that other methods and machines capable of effecting the permanent connection desired may be substituted for the welding unit 15 and in Figures 3, 4 and 5 three alternate types of joining machines are diagrammatically illustrated which are adapted individually to be substituted in the apparatus and method of Figures 1 and 2 for the unit 15.

Figure 3:
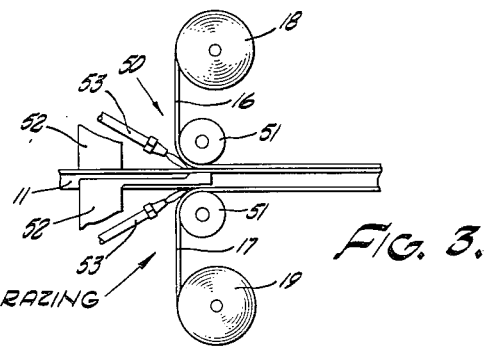
Figure 3 is a diagrammatic showing of a gas brazing unit which is adapted to be substituted for the electric welding unit in the system illustrated in Figures 1 and 2.

In the joining machine illustrated in Figure 3 the unit is indicated generally by the reference character 50 and is to be understood to be illustrative of a flame brazing unit. The core 11 is again brought into juxtaposition to the exterior face sheets 16 and 17 which are fed from suitable sources of supply such as rolls 18 and 19, respectively. The sheets 16 and 17 pass around pressure rollers 51 by which they are forced against the core and also against fixed anvils 52 which extend into the core to points directly opposite the rollers 51. Conventional brazing torch nozzles 53, sized and mounted as to direct their flames to the V angles between the corrugations of the abutting core and the face sheets, effect a brazing action along the lines of contact between the core sheet and face sheets, the former being, in this instance, preferably coated with a suitable brazing material such as brass. As stated, the joining machine of Figure 3 is adapted to be substituted for the unit 15 in the apparatus illustrated diagrammatically in Figure 1, and the modified method is otherwise identical to that described in connection with the first embodiment of the invention.

Figure 4:
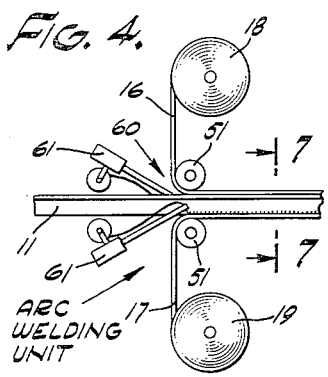
Figure 4 is a diagrammatic showing of an arc welding unit adapted to be substituted for the electric welding unit in the system illustrated in Figures 1 and 2.
Figure 9:
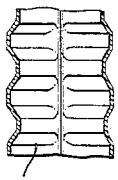
Figure 9 is an exaggerated enlarged section through the core plate upon the line 9—9 of Figure 6.

Referring now to Figure 4 in particular, a second modified joining machine is illustrated and in this instance comprises an arc welding unit indicated generally by the reference character 60. This unit in general is identical to the construction of Figure 3, the exceptions being that the anvils 52 are omitted and in place of the brazing nozzles 53 are substituted individual arc welding units 61 including in each instance the necessary welding contact and an automatically fed supply of welding metal. The individual welding units 61 are arranged in the convolution of the core as to form welds along the line of contact between the core and the adjacent face sheet as indicated at 62 in Figure 6. There will be as many individual welding units 61 as there are convolutions of the core, obviously. As in the case of the brazing unit of Figure 3 the welding unit of Figure 4 is adapted to be substituted in the method and apparatus illustrated in Figure 1. The resulting method is identical to that described in connection with Figure 1 with the exception of the difference effected by the substitution of the welding unit 60 for the welding unit 15. It is also within the scope of the invention to employ the anvils 52 in the apparatus shown in Figure 3.

Referring now to Figure 5 in particular, still another form of joining machine is illustrated this time comprising a riveting unit generally indicated by the reference character 70. The general arrangement is again the same as in Figure 3 but in place of the brazing apparatus there is substituted a riveting mechanism. The latter comprises suitable anvil units 71 which extend into the core, in the manner illustrated by the inner contacts 24 of the welding unit in Figure 2, and which cooperate in each instance with exterior rivet-feeding and -seating elements 72 which contact the exterior surfaces of face plates 16 and 17 and are adapted to drive the rivets therethrough and against the opposed anvil. The product of this operation is shown in section in Figure 8. It is to be understood that the riveting unit comprising another type of joining machine is also adapted to be substituted in the method and apparatus of Figure 1. When the joining machine performs a riveting function the advance of the sheets will be by a step-by-step motion, obviously. This same motion can be adapted to the other methods, if desired.

Figure 6:
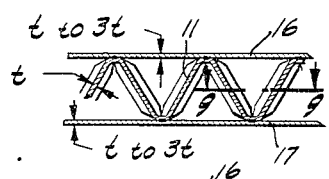
Figure 6 is a transverse section upon the line 6—6 of Figure 1 through a fabricated panel constructed in accordance with the present invention by the electric welding method of Figures 1 and 2, or the brazing method of Figure 3.
Figure 7:
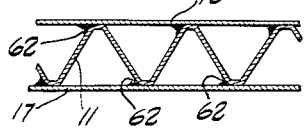
Figure 7 is a similar section upon the line 7—7 of Figure 4 through the product when welded by the use of the welding unit of Figure 4.
Figure 8:
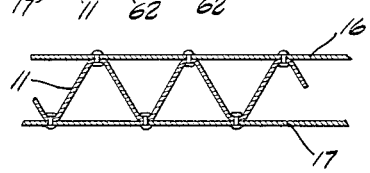
Figure 8 is still another section upon the line 8—8 of Figure 5 riveted by the use of the riveting unit of Figure 5.

Referring now to Figures 6, 7 and 8 in particular, the improved fabricated sandwich panel constructed in accordance with the present invention is illustrated in section in the slightly modified forms which are characteristic of the products of the different methods described. Figure 6 illustrates the product produced by the method of Figures 1 and 2, and also that method as modified and when embodying the brazing unit of Figure 3. The unit of Figure 7 represents the product produced when the method incorporates the arc welding unit of Figure 4, while Figure 8 discloses the riveted type product resulting from the use of the riveting unit of Figure 5. The exact dimensions and thicknesses are variables but in one very desirable form the face plates have a thickness three times that of the core sheet while the distance between crests or ridges in the core is about eighty times the thickness of the core sheet. An important feature comprises the fact that the sides of the corrugations are flat which provides greatly increased strength over the conventional type construction in which the corrugations might be said to be sinusoidal in section and, of course, extend transversely. By the use of the flat-sided corrugations stiffness has been increased many times while bending strength has also been greatly increased, compared, in each instance, with solid sheets of the same weight.

The sandwich panel constructed in accordance with the present invention has certain inherent advantages not to be found in the prior art constructions. Because of the longitudinal extension of the corrugations cooling or heating fluids can be circulated between the facings providing an efficient smooth surface heat exchanger having good structural strength characteristics and a clean appearance. Because of the increased strength characterizing the product it is possible to construct panels greatly larger than solid sheets of the same weight. As the product is made in continuous strips or lengths it is possible to construct economically long runs which can subsequently be cut and formed to required lengths and shapes at later times. This is not true in other constructions in which the core is differently fabricated. When desired, the cells formed within the built-up sandwich can be filled in the manner of elongated tubes with cerrobend, which melts in hot water, or other suitable material, the unit formed to shape and the filler subsequently removed if desired. In current types in which the cells are closed at their ends this is not possible, for they cannot be filled and later emptied. The sound and heat insulation properties of the product are improved by virtue of the arrangement of the cells, it being found that with the open ends of the cells abutting the face sheets as in current products the sound transference is greater and the heat insulation properties less.

The invention has been described in detail for the purpose of illustration but it will be obvious that numerous modifications and variations may be resorted to within the spirit of the invention as defined in the accompanying claims.

I claim:

1. A method of forming structural sandwich elements, which comprises feeding a core strip of metal through a corrugator to form corrugations extending longitudinally of the core strip, subjecting the corrugated core strip to heat treatment to relieve internal stresses, feeding flat face strips of metal transversely from opposite sides of said core strip and bending said face strips at points adjacent said core strip and into contact therewith, said face strips contacting said core strip at lines of initial contact which are generally opposite each other, and operating directly upon the ridges of said core strip in a manner effecting joining of said core strip to said face strips by heat bonding, said last-named step being performed adjacent said lines of initial contact between said core strip and face strips, and subjecting the formed sandwich to heat treatment to relieve internal stress.

2. The invention as claimed in claim 1, characterized in that said joining step comprises arc welding in which weld metal is deposited in grooves formed between the individual corrugations of said core strip and the interior surfaces of said face strips.

3. The invention as claimed in claim 1, characterized in that said joining operation comprises resistance welding in which one electrode is disposed against the interior surface of each ridge of said core strip, and the other electrode is disposed against the exterior face strip surface opposite thereto.

4. An improved method of making corrugated sandwich-type, weldable metallic structural sheet material comprising feeding flat sheet metal material continuously from a roll thereof, deforming said material into a corrugated section in which the corrugations extend in the direction of travel of said material and forming integral deformed ribs in the sides of said corrugations extending transversely to the direction of said corrugations, subjecting the corrugated material to heat treatment to relieve internal stresses, feeding flat sheet metal material from two rolls thereof into contact with said corrugated material on either side thereof, and continuously securing permanently said flat metal sheet material to the apexes of the corrugations of said corrugated material to thereby form a sandwich consisting of said corrugated material as a core and said flat material as facing sheets.

References Cited in the file of this patent

UNITED STATES PATENTS

| | | |
|---|---|---|
| 849,502 | Rude | Apr. 9, 1907 |
| 1,427,904 | Junkers | Sept. 5, 1922 |
| 1,734,932 | Weed | Nov. 5, 1929 |
| 1,761,037 | Gross | June 3, 1930 |
| 1,990,738 | La Porte | Feb. 12, 1935 |
| 2,244,847 | Oeckl | June 10, 1941 |
| 2,299,776 | Weightman | Oct. 27, 1942 |
| 2,363,972 | Kellogg | Nov. 28, 1944 |
| 2,406,051 | Weiss | Aug. 20, 1946 |
| 2,423,870 | Blessing | July 15, 1947 |
| 2,662,272 | Macomber | Dec. 15, 1953 |
| 2,666,252 | Temple | Jan. 19, 1954 |